(12) United States Patent
Hsiao

(10) Patent No.: US 7,174,850 B2
(45) Date of Patent: Feb. 13, 2007

(54) MULTI-LAYERED AQUACULTURE SYSTEM

(76) Inventor: Shyh-Min Tom Hsiao, 56,269 Lane, Lin-Tsen E. Road, Chia-Yi City 600 (TW)

( * ) Notice: Subject to any disclaimer, the term of this patent is extended or adjusted under 35 U.S.C. 154(b) by 205 days.

(21) Appl. No.: 10/960,220

(22) Filed: Oct. 7, 2004

(65) Prior Publication Data
US 2006/0042556 A1 Mar. 2, 2006

Related U.S. Application Data

(63) Continuation-in-part of application No. 10/929,901, filed on Aug. 30, 2004, now Pat. No. 7,000,567, and a continuation-in-part of application No. 10/943,173, filed on Sep. 16, 2004.

(51) Int. Cl.
*A01K 61/00* (2006.01)
(52) U.S. Cl. .................. 119/204; 119/248; 119/251; 119/207
(58) Field of Classification Search ............... 119/201, 119/204, 207, 209, 224, 245, 246, 247, 249, 119/261, 266, 267, 269, 251
See application file for complete search history.

(56) References Cited

U.S. PATENT DOCUMENTS

| | | | | |
|---|---|---|---|---|
| 1,634,305 A * | 7/1927 | Schrimp | ............... | 119/267 |
| 1,860,698 A * | 5/1932 | Venditti | ............... | 119/267 |
| 3,316,882 A * | 5/1967 | Renwick | ............... | 119/269 |
| 3,563,204 A * | 2/1971 | Szilagyi | ............... | 119/267 |
| 3,749,901 A * | 7/1973 | Clough | ............... | 362/562 |
| 3,757,739 A * | 9/1973 | Whitener | ............... | 119/261 |
| 3,795,225 A * | 3/1974 | Ogui | ............... | 119/248 |
| 3,951,104 A * | 4/1976 | Neff | ............... | 119/216 |
| 4,006,711 A * | 2/1977 | Frank | ............... | 119/256 |
| 4,026,243 A * | 5/1977 | Jessop, III | ............... | 119/246 |
| 4,036,189 A * | 7/1977 | Neff | ............... | 119/51.04 |
| 4,081,666 A * | 3/1978 | Roehrick | ............... | 362/253 |
| 4,147,131 A * | 4/1979 | Walker | ............... | 119/246 |
| 4,259,926 A * | 4/1981 | Marliave | ............... | 119/208 |
| 4,379,437 A * | 4/1983 | Knowles | ............... | 119/230 |
| 4,509,458 A * | 4/1985 | Rines et al. | ............... | 119/217 |
| 4,684,462 A * | 8/1987 | Augustyniak | ............... | 210/97 |
| 4,787,336 A * | 11/1988 | Lineberry | ............... | 119/246 |
| 4,836,142 A * | 6/1989 | Duback | ............... | 119/255 |
| 5,042,425 A * | 8/1991 | Frost, Jr. | ............... | 119/246 |
| 5,054,422 A * | 10/1991 | Nojima et al. | ............... | 119/215 |
| 5,066,394 A * | 11/1991 | Harrison | ............... | 210/169 |
| 5,160,431 A * | 11/1992 | Marioni | ............... | 210/169 |
| 5,317,991 A * | 6/1994 | Lee et al. | ............... | 119/249 |
| 5,546,289 A * | 8/1996 | Gordon | ............... | 362/101 |

(Continued)

*Primary Examiner*—Yvonne R. Abbott
(74) *Attorney, Agent, or Firm*—Kusner & Jaffe

(57) ABSTRACT

By directing the none-molting crustaceans to move into a predetermined area in a culture tank, the present invention discloses a multi-layered aquaculture system with shallow-water containers which is based upon the utilization of the methods and apparatus to eliminate their cannibalistic actions towards newly molted mates. This multi-layered aquaculture system for aquatic crustaceans comprises multi-layered containers for carrying the water body of culture and a means for generating an effect of bright and dark contrast at predetermined places within one or every afore-said containers. A means for arranging even water flow is further adapted to the containers with substantially no impact on the effect of the bright and dark contrast to take place at predetermined places.

9 Claims, 5 Drawing Sheets

U.S. PATENT DOCUMENTS

| | | | |
|---|---|---|---|
| 5,713,303 A * | 2/1998 | Willinsky et al. | 119/218 |
| 5,816,196 A * | 10/1998 | Webster et al. | 119/228 |
| 6,158,386 A * | 12/2000 | Limcaco | 119/245 |
| 6,305,324 B1 * | 10/2001 | Hallock et al. | 119/248 |
| 6,346,262 B1 * | 2/2002 | Levy | 424/408 |
| 6,347,908 B1 * | 2/2002 | Safwat | 405/81 |
| 6,357,392 B1 * | 3/2002 | Ido | 119/252 |
| 6,588,371 B2 * | 7/2003 | Hallock et al. | 119/248 |
| 2001/0045189 A1 * | 11/2001 | McNeil | 119/204 |
| 2002/0185080 A1 * | 12/2002 | Ortiz | 119/245 |
| 2005/0072368 A1 * | 4/2005 | Hsiao | 119/211 |

* cited by examiner

MULTI-LAYERED AQUACULTURE SYSTEM

RELATED APPLICATIONS

The present invention is a Continuation-In-Part (CIP) of U.S. application Ser. No. 10/929,901 filed on Aug. 30, 2004 now U.S. Pat. No. 7,000,567, entitled "Method for guiding aquatic crustaceans by utilizing their biological tendency responding to bright and dark contrast", and a Continuation-In-Part (CIP) of application, U.S. application Ser. No. 10/943,173, filed on Sep. 16, 2004, entitled "Apparatus for guiding aquatic crustaceans by utilizing their biological tendency responding to bright and dark contrast". These applications are both fully incorporated herein by reference.

BACKGROUND OF THE INVENTION

1. Field of the Invention

The present invention relates to a multi-layered aquaculture system which utilizes the methods and apparatuses for guiding aquatic crustaceans' locomotive orientation with their innate biological tendency responding to specific contrasts of bright and dark. This multi-layered aquaculture system also utilizes a means for arranging even water follow to efficiently promote the utilization of above-mentioned methods and apparatuses and at the same time facilitate the removal of physical or biological wastes from the water body of culture.

2. Description of Related Art

Aquatic crustaceans are important economic animals. People usually obtain those animals by harvesting them from nature environment directly or by artificial cultivation. Many countries have paid great attention to focus on this artificial cultivation. Traditionally, such artificial cultivation (named aquaculture) makes use of wide expanse of land and ponds with natural water supply. Recently, several automated high-density culturing systems have been disclosed. These systems use water recirculation equipments and filtering apparatuses to curtail both the consumption of water and land resources and the damages to the natural environment, like U.S. Pat. Nos. 4,368,691, 4,446,025 and 5,961,831. High-density cultivation systems bring larger profit margins but simultaneously increase the production loss resulting from cannibalization of animals densely living in the systems. This loss is derived from differences in size and living stage of cultured animals, ex. newly molted or immature crustaceans are usually vulnerable to predation of their none-molted and/or larger mates within the same body of water. This is the bottleneck in the efforts to elevate the culture density and hence to increase profits as well.

Cannibalism-avoiding behavioral management is thus an important task for maintaining cultivated aquatic crustaceans in above-said high-density systems. For that purpose, spatial separation of molting and none-molting crustaceans is one way to avoid molted animals from being predated. Several means to attract aquatic crustaceans' active moving can be employed in attempting to lure none-molting animals to stay away from molted ones. For example, traditional pond culture or tank culture uses deep water and wide space to passively reduce the contact between newly molted and none-molted crustaceans. In addition, scent/taste attractants and chemo-attractants are used to manage crustacean's displacement over feeding, breeding and hatching. U.S. Pat. No. 5,706,759 discloses a process to investigate potential chemo-stimulants, chemo-repelling agents or chemo-attractants for shrimps, but this invention still lacks further practical techniques for behavioral management in high-density culture. A kind of bait fluid, such as fish oil, is used in U.S. Pat. No. 4,828,829 for harvesting crab only with expected high efficiency. A food-luring trapper using an attractor to attract plankton or other similar shrimp food organisms is designed to allure and catch shrimp (U.S. Pat. No. 5,259,809). No other successful methods for managing the motion of aquatic crustaceans in the light of their biological responses reacting to bright and dark visual stimuli have been developed previously.

Due to lack of proper techniques for culturing and managing aquatic crustaceans in high densities, the newly developed re-circulation systems have culture densities always maintained as a balance between cannibalization and growth, and, in shrimp, the culture pond or tank is always kept in certain water depth, about 0.6 to 2.0 meter, in order to reduce the incidence of cannibalizing behavior basing on the behavior that newly molted shrimp jump back or up away in order to escape from the attack of other none-molted shrimp mates. The culture water body with the depth of 0.6 to 2.0 meters has too large a mass to enable the development of multi-layered culture system and thus the traditional culture system is restricted to a planar installation. In nature, many aquatic crustaceans, such as shrimps, inhabit in water environments with bright-dark alternating or contrasting light effects appearing as wavy light reflections in shelters and crevices but not in open fields. Crustaceans may use these light effects to aim for a potential hiding place. Once arriving to the location, they may use their other senses, such as tactile senses, to decide if they would take the action of hiding or go for another potential location.

Propensity to react to the bright and dark visual stimuli in aquatic crustaceans is a unique nature which can be used in a feasible means to guide their motion and localization. The present invention utilizes methods and apparatuses for guiding aquatic crustaceans, which is centered upon the aforesaid biological tendency, to overcome the serious problem of cannibalism encountered in the culture system which adopts shallow-water containers and further to increase efficiency of land use to almost 10 times or more by the construction of multi-layered aquaculture system. The present invention, a multi-layered shallow-water culture system installed with a water flow arrangement means to efficiently promote the utilization of above-mentioned methods and apparatuses and at the same time facilitate the removal of physical or biological wastes from the water body of culture. No practical concepts in the prior arts, however, are disclosed as an efficient and effective system for culturing aquatic crustaceans in this multi-layered style similar to the present invention.

SUMMARY OF THE INVENTION

Specific dark and bright contrasts generated by dynamic or static light-emitting sources directly or through reflection and filtration are used to attract aquatic crustaceans' active moving close to predetermined places in a culture tank. Apparatuses or methods utilizing such bright and dark contrast effect to manage the crustaceans' behavior enable the shallow-water culture with cannibalistic activities under control. The active management of cannibalism of this present invention also eliminates the need of culture-tank's high water depth (60–200 cm) expected to be helpful for cannibalism control. Thus, through making shadow-water culture possible, this present invention gives the feasibility to install shallow-water tanks into a multi-layered culturing system. This kind of multi-layered aquaculture system with a plurality of shallow-water containers is based mainly upon the utilization of the apparatuses and methods which are capable of gathering the crustaceans into a predetermined area and letting newly molted mates retract backward away from this predetermined area where most none-molted crustaceans gathered.

Accordingly, the present invention provides a multi-layered system adopting shallow-water containers by means of the methods and apparatuses for guiding the motion and localization of aquatic crustaceans. These methods comprise the step of generating the effect of bright and dark contrast at the predetermined place within the body of water and these apparatuses used to carry out the aforesaid methods comprises a container and a means for generating the effect of dark and bright contrast at the container's predetermined place. Both the methods and the apparatuses are described in the aforementioned co-pending applications, which are incorporated herein for reference.

In summary, the multi-layered aquaculture system for aquatic crustaceans in the present invention comprises multi-layered containers for carrying the water body of culture and a means for generating an effect of bright and dark contrast at predetermined places within one or every afore-said containers. A means for arranging even water flow is further adapted to the afore-said containers in the aquaculture system to efficiently promote the utilization of above-mentioned methods and apparatuses and at the same time facilitate the removal of physical or biological wastes from the water body of culture.

Position of the predetermined place mentioned above is at any region chosen from the bottom layer, walls or any other space from bottom up to the water surface of the water body inside the container where the aforesaid means for generating an effect of bright and dark contrast is adapted to.

Within the above-said chosen region, the bright and dark contrast can be spread, generated or projected on the container itself and/or any floating attachable material and/or any fixed attachable material in one, several or all containers of the multi-layered culture system of the present invention.

The effect of bright and dark contrast is generated by specific means for generating an effect of bright and dark contrast as described in the aforementioned co-pending application, which is incorporated herein for reference. In brief, the effect of bright and dark contrast for managing the cannibalistic and other behavior of aquatic crustaceans reared in the container of the present multi-layered culture system can be generated by one or many light-emitting sources directly and/or modified with reflection arrangements, of one or more combinations of painted figures and/or one or more sets of protrusions, and/or light filtration setups, of one or more filters of various designs. This bright and dark contrast effect is expressed at a predetermined place of the aforesaid container. Such means for generating the effect of bright and dark contrast can be installed onto the predetermined place directly, the nearby space above water or even the exterior side of the container as long as the effect of bright and dark contrast projected, spread or generated at the predetermined place can be received by the cultured crustaceans.

The above-mentioned means for generating the effect of bright and dark contrast includes the usage of one or more light-emitting sources of nature and of incandescent/fluorescent light bulbs or the LEDs directly, or modified with one or more light filters, one or more sets of shadow-producing protrusions or one or more sets reflection producing painted figures. Each of the above-listed light filter has structures of two or more light transparencies between and including 0 to 100%. A filter plate used in this invention, which has 0% transparency at its plate body and 100% transparency at its perforations, is an extreme case.

At the predetermined place in a container of the multi-layered culture system, spots lighted up with natural light, glowing light bulbs and/or LEDs, by light reflected from portions of figures with higher light reflections and/or protrusions facing light sources, and by the illuminating light passing through high-transparency perforations of a light filter are defined as the first brightness sub-areas, and the unlighted spots, with less illumination, with less reflected light and of shadow cast areas are defined as the second brightness sub-areas.

Thus the aforesaid predetermined place can be distinguished into one or more first brightness sub-areas and one or more second brightness sub-areas, wherein the aforesaid first brightness sub-areas are brighter than the aforesaid second brightness sub-areas. The bright and dark contrast is the contrast between the first brightness sub-areas and the connected or nearby second brightness sub-areas.

A means for arranging even water flow, for culture water to flow evenly, enhancing the bright and dark contrast effect and further linking adequate life-support to each container to avoid unwanted variations in water quality and to maintain the cultured crustaceans in a proper living condition, is also adapted to the present multi-layered culture system with multiple shallow-water containers.

Other equipments such as an aeration system, a physical filtering equipment, a biochemical filtering equipment, other sets of flow control piping and water delivery motor, a heater, an UV-light decontaminator and/or any other equipments which facilitate the life-support function and the culture efficiency of the present multi-layered aquaculture system can be further coupled to the shallow-water containers.

Since the active control of cannibalism through behavior management removes the need of container's high water depth (60–200 cm) traditionally adapted for culturing aquatic crustaceans and others, a multi-layered culture system with multiple shallow-water containers as disclosed in this present invention can be developed. This present invention contributes to a culture system not only for high-density culture of aquatic animals at each shallow-water container but also for high space utilization with the shallow-water containers positioned one above the other. These high-efficiencies in culture density and space utilization lead to the acquirement of a higher ratio of benefit/cost in aquaculture industry.

BRIEF DESCRIPTION OF THE DRAWINGS

In the drawings:

FIGS. 1–7 are schematic drawings of (1) the multi-layered culture system with multiple shallow-water containers; (2) the means for arranging even water flow and (3) the means for generating the visual effect of bright and dark contrast used in the multi-layered culturing system.

FIG. 1 is a schematic presentation of a multi-layered culture system with multiple shallow-water containers.

FIG. 3 is a schematic presentation of a light-reflector installed at the bottom portion of the water body of culture, which is constituted by a grid-like pattern created by dark-colored adhesive tapes or paints applied on the bottom of a culture container.

FIG. 5 is a schematic presentation of a light sifting filter plate that provides the specific light effect onto a predetermined place at the bottom portion of the water body of culture.

FIGS. 6 and 7 are schematic presentations of networks of wall-like and cone-like protrusions respectively installed at the bottom portion of the water body of culture.

DETAILED DESCRIPTION OF THE PREFERRED EMBODIMENTS

The present invention discloses a construct of the multi-layered aquaculture system with multiple shallow-water containers within which cannibalistic actions between the reared crustaceans are controlled by behavior management means. This multi-layered aquaculture system with multiple shallow-water containers are built in with the apparatuses and methods capable of gathering the crustaceans into or away a predetermined area. That is newly molted crustaceans cultured in the containers of the present aquaculture system retract backward away from the predetermined area to avoid being cannibalized by none-molted crustaceans who stay at the predetermined place.

The methods comprise the step of generating the effect of bright and dark contrast at the predetermined place within the water body of culture. The apparatuses designed for carrying out the aforesaid methods to attract the aquatic crustaceans comprises a container and a means for generating an effect of dark and bright contrast at the container's predetermined place. Both the methods and the apparatuses are described in the aforementioned co-pending applications, Ser. No. 10/929,901, filed on Aug. 30, 2004 and entitled "Method for guiding aquatic crustaceans by utilizing their biological tendency responding to bright and dark contrast", and Ser. No. 10/943,173, filed on Sep. 16, 2004 and entitled "Apparatus for guiding aquatic crustaceans by utilizing their biological tendency responding to bright and dark contrast", incorporated herein for reference.

Figure 1:
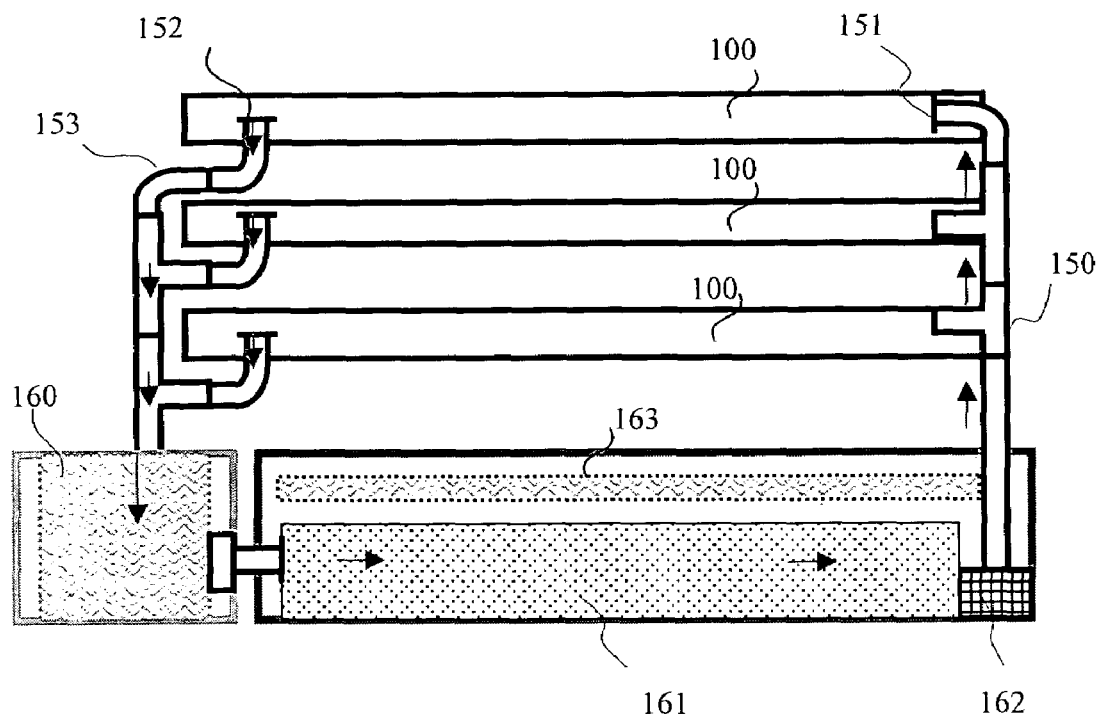

The present invention, the multi-layered aquaculture system for culturing aquatic crustaceans, as shown in FIG. 1, comprises a plurality of shallow-water containers for carrying the water body of culture installed vertically one above the other. A means for generating an effect of bright and dark contrast is further set up at the bottom of any or each shallow-water container.

A means for arranging even water flow installed onto the above-said multi-layered culture system links adequate life-support to each container to efficiently remove the waste from the water in order to maintain the culture water in a proper condition without unwanted variations in water quality. The above-said water-flow driven by a water pump is evenly distributed in the water body of culture to provide a proper condition for the behavior management methods and apparatuses to take their effects. Thus the water may be injected in by a water pump from one or more sets of water inlets at one side with a drain positioned on the other side of a container to provide even water flow, see FIG. 2a.

Other equipments such as an aeration system, a physical filtering equipment, a biochemical filtering equipment, other sets of flow control piping and water delivery motor, an heater, an UV-light decontaminator and/or any other equipments which facilitate the life-support function and the high culture efficiency of the present multi-layered aquaculture system can be further coupled to any or each of the shallow-water containers.

The multiple containers and other optional equipments in the present invention mentioned above are installed or constructed in the usual manner as the normal construct known by any skilled in the art of aquaculture and aquaculture related construction, manufacturing, electronic and/or other fields needed for building such an aquaculture system.

The multi-layered aquaculture system with shallow-water containers and optional equipments installed is shown in FIG. 1.

Figure 2A:
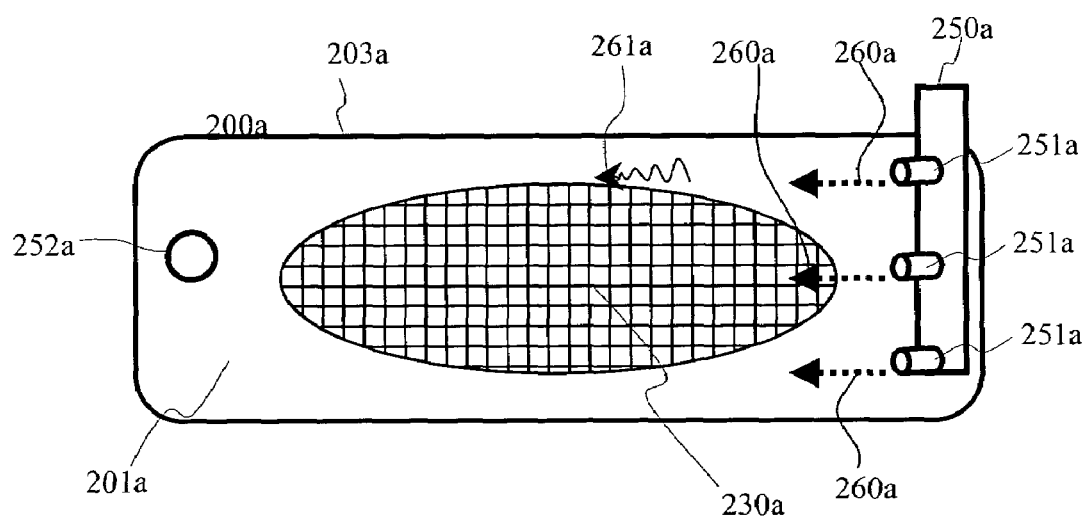
FIG. 2a is a bird-sight view of a container with a rectangular-shaped bottom demonstrating that one water distribution pipe, with three water inlets opening to one side of the container, injects the water evenly into the container. The water, after flowing evenly through the main body of the container, reaches to a drain on the other side of the container. There is a predetermined place at the container's central bottom where the effect of bright and dark contrast is expressed.

FIG. 2a is a bird-sight view of a rectangular container in which there is a water supply pipe equipped with single set of three water inlets positioned at the right hand side of the container. The water pipe, through its inlets, injects water into the container and creates a relatively even current across the entire container before reaching the drain. This current's evenness is adjusted for behavior management function of the bright and dark effects to take place at the predetermined place.

Figure 2B:
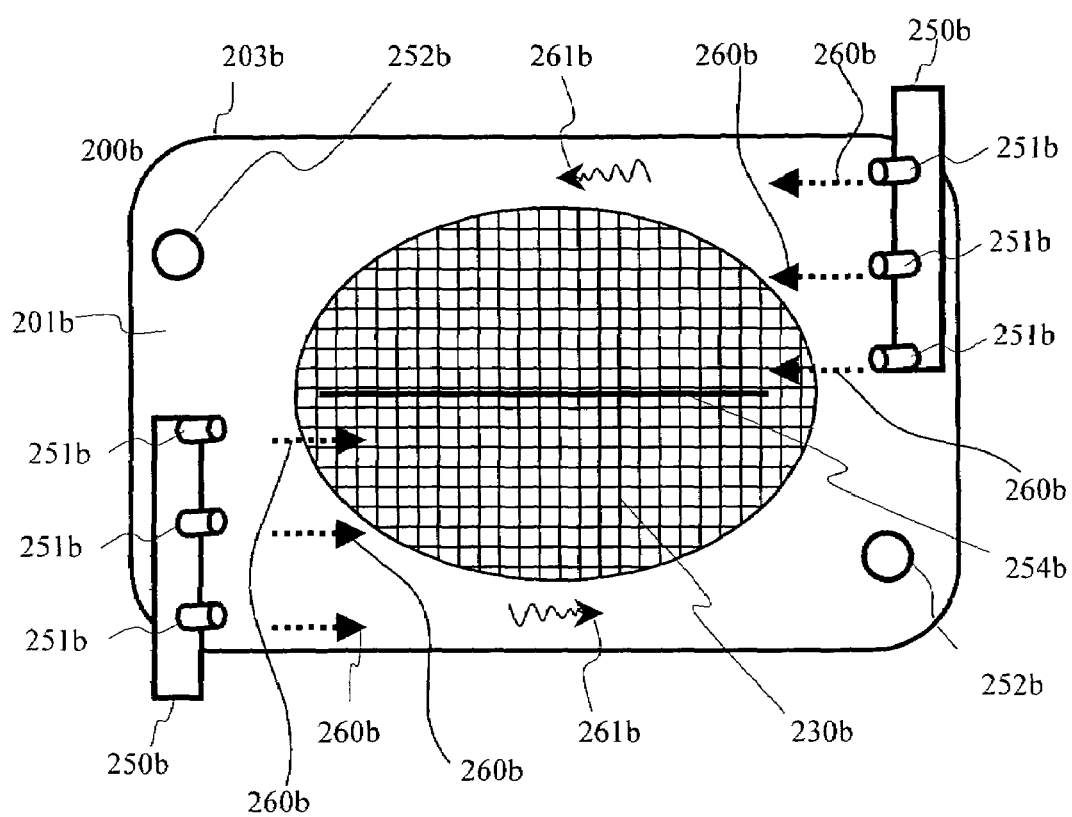
FIG. 2b is a bird-sight view of a container, expanded from the one seen in FIG. 2a, demonstrating that two water distribution pipes, each with three water inlets, positioned on two opposite sides, inject the water evenly into the container in opposite directions. Also, there is a predetermined place at the container's central bottom where the effect of bright and dark contrast is expressed. A divider is erected in the middle place of the container to maintain even and smooth currents on both sides of the divider.

FIG. 2b is a bird-sight view of an expanded rectangular container with two halves separated by a divider. For water supply, a set of three water inlets is equipped onto each of the two water supply pipes and these two sets of water inlets are positioned diagonally on opposite sides of the container. These two water pipes through the openings of their water inlets inject water into their halves of the container. At each half, the water flow is adjusted to be sufficiently even all the way across the container for behavior management function of the bright and dark effects to take place at the predetermined place. The container shown in FIG. 2a or FIG. 2b is an exemplified scheme of any shallow-water container installed in the multi-layered aquaculture system.

The lateral view of a multi-layered aquaculture system is depicted in FIG. 1. A plurality of containers 100 is vertically-integrated one above the other in a multi-layered style. In this embodiment, only three layers of container are installed but in other embodiments, the aquaculture system may comprise more containers than three. Arrows in FIG. 1 mark the flow direction. Each container 100 in the aquaculture system has a set of water inlets 151 connected to piping of flow-in water 150 and a water drain 152 connected to piping of flow-out water 153. The number and/or size of the set of water inlet 151 and the connected flow-in pipe 150 or the water drain 152 and the connected flow-out pipe 153 can be adjusted to modify the circulating rate of the culture water and number, size and/or position angle of the inlet openings in the set of water inlet can all be adjusted pursuant to the volume of the water, the evenness of the water current, and the injection angles of the incoming water and/or the drainage arrangements of the flow rout pipe. The aforesaid water inlets 151 and the water drain 152, used for carrying out common refilling/draining tasks, are also capable to be linked to life-support devices. The life-support devices, a physical filtering system 160, an aeration equipment 163, a biochemical filtering equipment 161 and water delivery motor 162, can be further installed onto the present multi-layered culture system.

Other equipments such as a heater, sets of flow control and extra water delivery motor, an UV-light decontaminator and/or any other equipment which facilitate the life-support function and the culture efficiency of the present multi-layered aquaculture system can be further coupled to the containers.

Installation of these optional equipments such as an aeration system, a physical filtering equipment and etc. are in a common manner as known by any skilled in the art of aquaculture and aquaculture-related construction, manufacturing, electronic and/or other fields needed for building such an aquaculture system.

Through the construction of the multi-layered culture system, the culture output per square meter land usage is progressively increased by adding culture layers and so is the economic benefit thereof to an extend.

In FIGS. 2a and 2b, containers 200a and 200b each exemplifies one layer of containers built into the multi-layered aquaculture system (see FIG. 1). The container 200a and 200b each comprises both the means for generating the visual effect of bright and dark contrast and the means for arranging even water flow to generating an even and slow water-flow with substantially no interference with the visual effect of the above said bright and dark contrast to take place.

In FIG. 2a, a flow control pipe 250a with a set of three water inlets 251a is installed onto the wall 203a. The flow-in water 260a is directed to flow at the direction 261a across the container 200a and reach to the water drain 252a without eddying. A predetermined place 230a is set up at the central portion 201a of the container 200a. The predetermined place 230a is used to attracting the reared crustaceans to move close as disclosed in the co-pending applications incorporated herein for reference. It is preferred to arrange the predetermined place 230a to cover the central portion of the container for newly molted crustaceans to retract and move out into the outer portion of the container.

In FIG. 2b, two flow control pipes 250b, each with a set of three water inlets 251b, are installed onto the wall 203b of the container 200b. The flow-in water 260b from the inlets 251b is directed to flow at direction 261b across the container 200b and reach to water drain 252b. The directions of the flow-in water 260b are preferred to be set in parallel with the longer sides of the wall 203b of the container 200b.

A divider 254b is erected in the middle place of the container 200b. This divider 254b facilitates the formation of the water-flow 261b coming from water inlets 251b and ending at water drain 252b without eddying. A predetermined place 230b expressing the effect of bright and dark contrast is set up at the center. The predetermined place 230b is used to attracting the reared crustaceans to move close as disclosed in the co-pending applications incorporated herein for reference. It is preferred to arrange the predetermined place 230 to cover the central portion of the container for newly molted crustaceans to retract and move out into the outer portion of the container. The means for generating the above said effect of bright and dark contrast is described in FIGS. 3–7 and also in the co-pending applications incorporated herein for reference.

The flow-out water brings out the particulate and dissolved wastes and passes through the life-support devices including filtering and aeration equipments.

The means for generating an effect of bright and dark contrast mentioned above is adapted to the containers to express the effect of bright and dark contrast over a predetermined place inside the container. The aforesaid predetermined place can therefore be distinguished by its composition of one or more first brightness sub-areas and one or more second brightness sub-areas.

The combination of any container in the multi-layered culture system with a predetermined place inside itself and a means for generating the effect of bright and dark contrast at the predetermined place can be considered as the mentioned apparatuses for guiding aquatic crustaceans by utilizing their biological tendency responding to bright and dark contrast described in the co-pending applications.

The means for generating the effect of bright and dark contrast comprises one or many light-emitting sources directly or one or more combinations of light-reflecting painted figures, one or more sets of light-reflecting protrusions and/or one or more light filters with various light sifting effects.

The predetermined place within the water body of culture is the place, presenting the visual effect, chosen from the bottom surface, the walls, or any space from bottom up to the water surface of the water body of culture. Within the above-said chosen region, the bright and dark contrast can be generated, projected, painted and/or spread, on any floating attachable material and/or any fixed attachable material.

The above-said effect of bright and dark contrast is generated by one or many light-emitting sources directly or modified by reflection of one or more combinations of painted figures and/or one or more sets of protrusions and/or by filtration of one or more light filters with various light sifting effects. Such light-emitting sources, light-reflecting or light filtering apparatuses/materials can be installed onto the above-said predetermined place directly, the nearby space above water or even the exterior side of the container's sides and bottom layer as long as the effect of bright and dark contrast generated, projected, spread and/or painted at the predetermined place can be received by the cultured crustaceans.

The aforesaid predetermined place can therefore be distinguished by its composition of one or more first brightness sub-areas and one or more second brightness sub-areas. The bright and dark contrast is the contrast between an above-said first brightness sub-area and an above-said second brightness sub-area. The aforesaid first brightness sub-areas are brighter than the aforesaid second brightness sub-areas.

The size and depth of a container carrying the water body of culture can vary according to the species and size of aquatic crustaceans reared in practice without specific limitations. For white shrimps, *Litopenaeus vannamei,* they can be cultured in a water body of about 10 cm depth, which is much less than the 60 cm to 200 cm depth in traditional marine culture for shrimp like blue shrimp, *Penaeus setiferus,* white shrimp, *Litopenaeus vannamei,* tiger shrimp, *Penaeus monodon,* and Kuruma shrimp, *Panaeus japonicus.*

The first brightness sub-areas and the second brightness sub-areas can be regularly or irregularly arranged and produced simultaneously or in an unsynchronized fashion. Modifying position or angle of the light reflecting/filtering apparatuses (such as the aforesaid painted figures, protrusions and filters) and/or the coexisting illuminating sources or changing the arrangement of the light emitters is capable of altering the brightness or the shape of each first or second brightness sub-area. Moreover, shapes, arrangements and reflection levels of the figures, the structures and characteristics of the filters are also ready to be adjusted in order to create the desired brightness in both first and second brightness sub-areas. The brightness of each first or second brightness sub-area is constant or changeable. Neither all first brightness sub-areas are necessarily of same brightness nor all second brightness sub-areas are necessarily of same brightness, if number of the first brightness sub-area and/or the second brightness area is larger than one.

Figure 5:
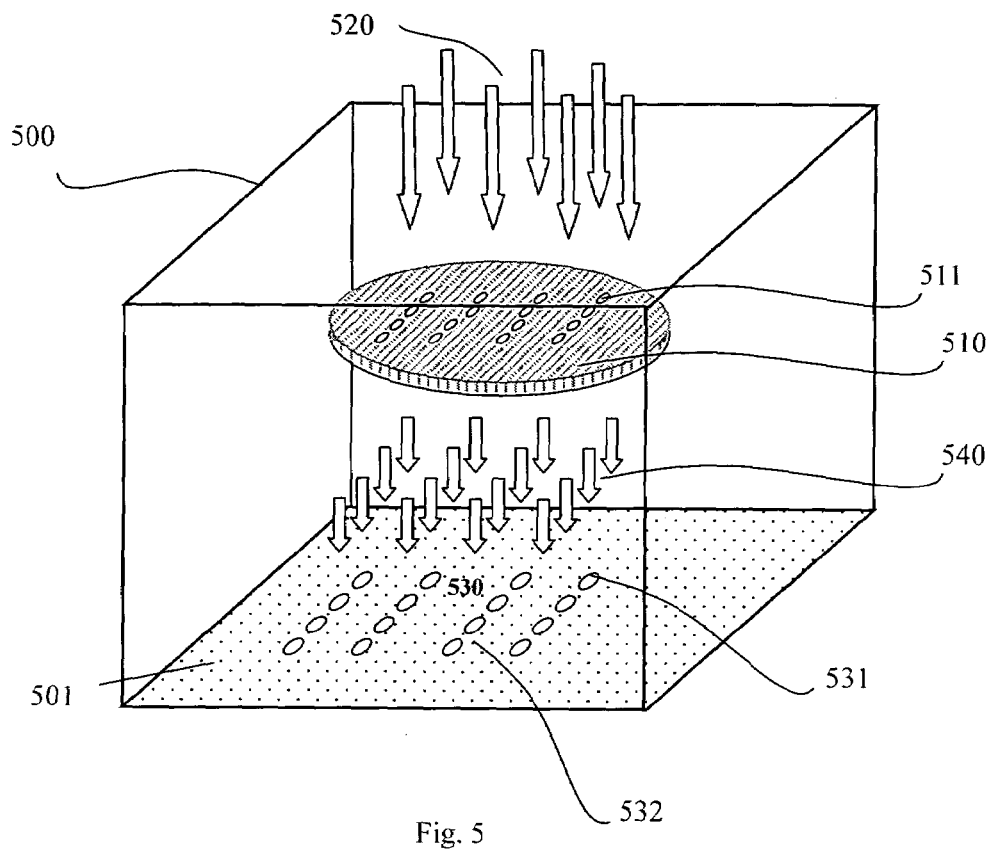
Figure 6:
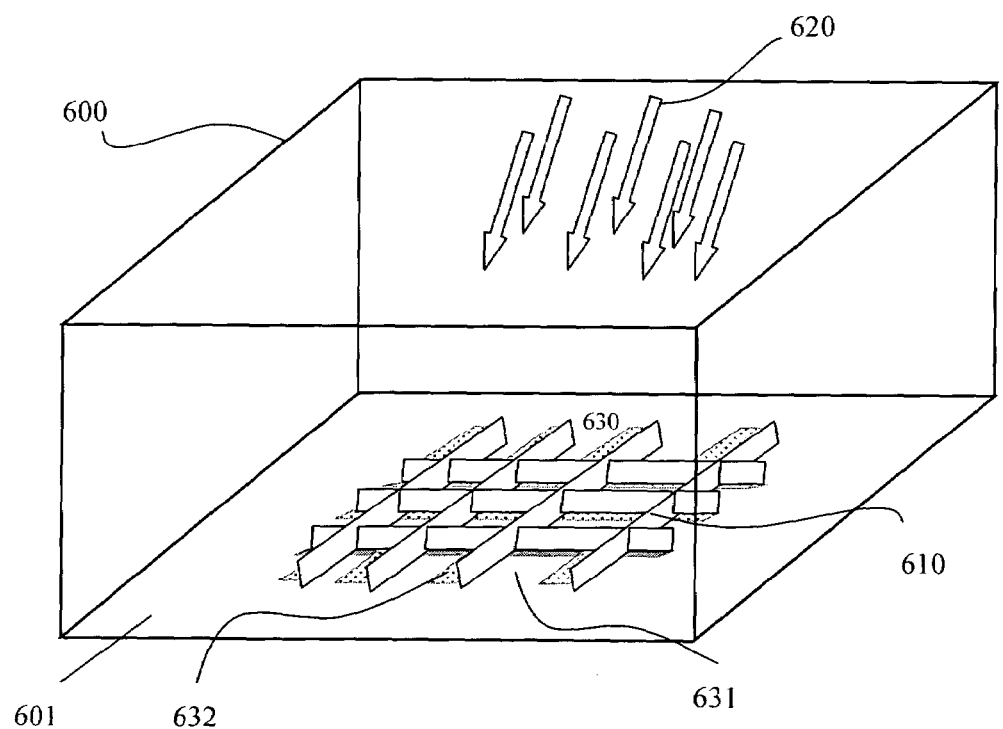
Figure 7:
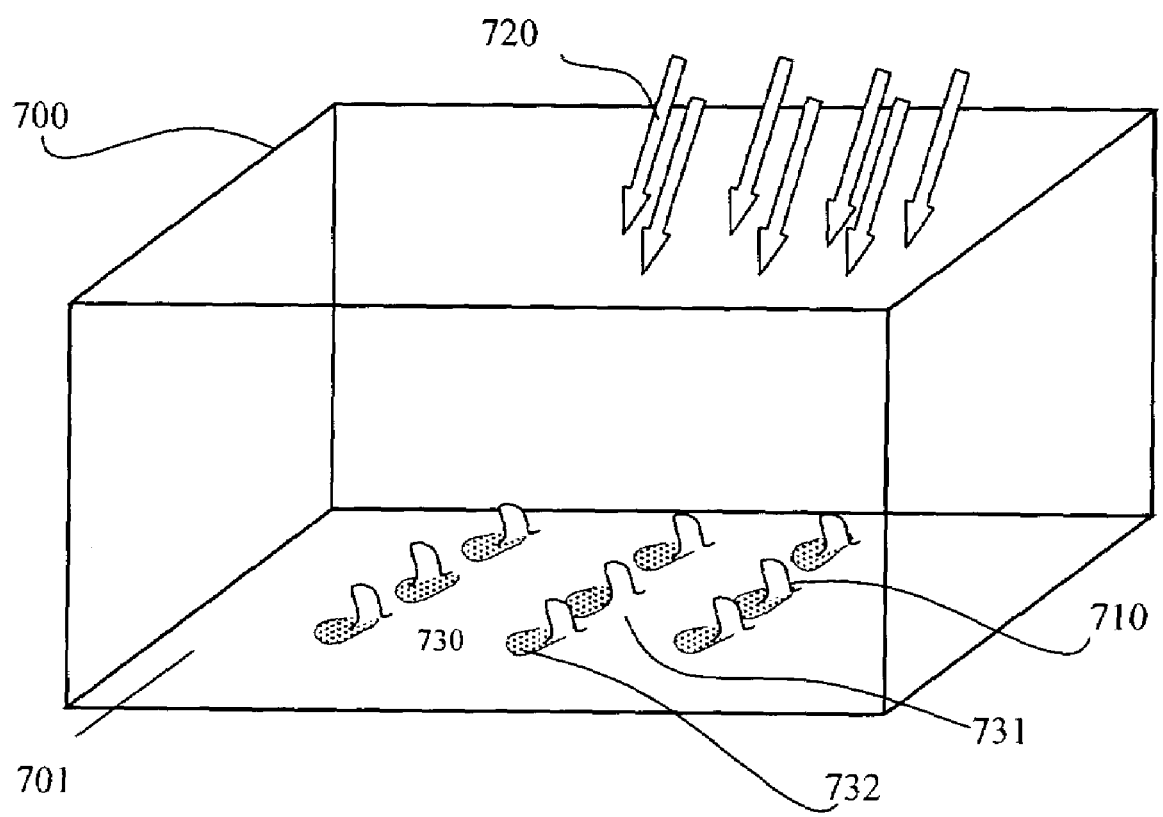

The bright and dark contrast can be produced from a light-emitting source directly (see FIGS. 4*a* and 4*b*), or with a light filter plate (see FIG. 5), a light-reflecting painted figure (see FIG. 3) and light reflecting networks of protrusions (see FIGS. 6 and 7).

When a light-emitter like LEDs or fluorescent/incandescent light is selected, it could be used as the light emitting source for generating the contrast effect directly and can be closely deployed at a predetermined place. Single or multiple said emitters, with/without same brightness, are both able to be utilized to generate the bright and dark contrast. On/off manipulations of the emitters, the differences between the emitters' brightness and the brightness differences between the surrounding less illuminated places and the places lighted by emitters all can produce aforementioned bright and dark contrast.

Figure 4A:
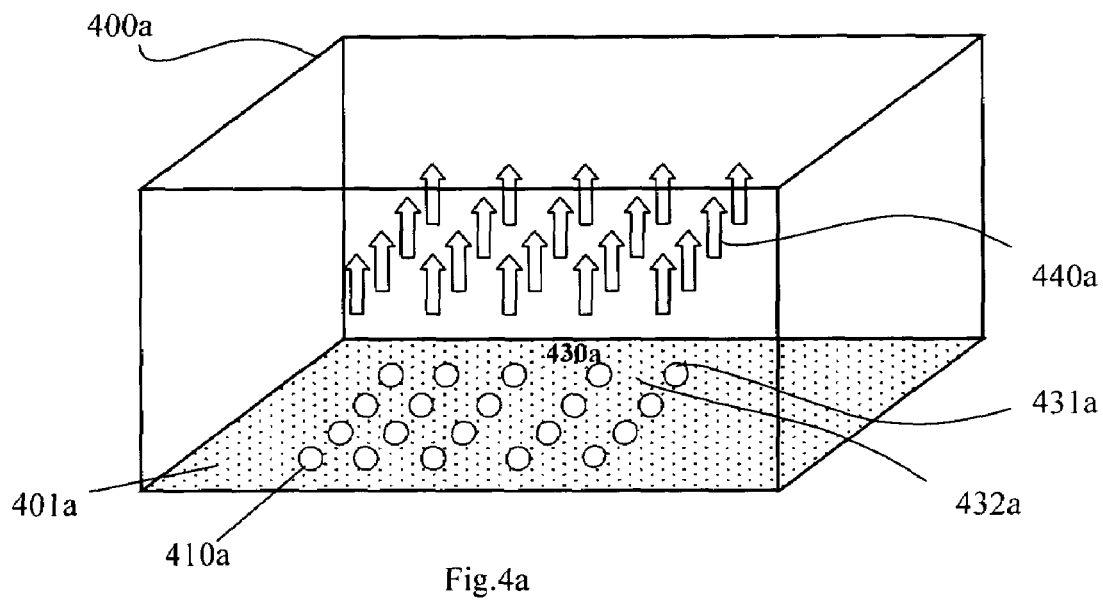
FIG. 4a is a schematic presentation of LED light-emitters installed at the bottom portion of the water body of culture, forming an array-like regular pattern.
Figure 4B:
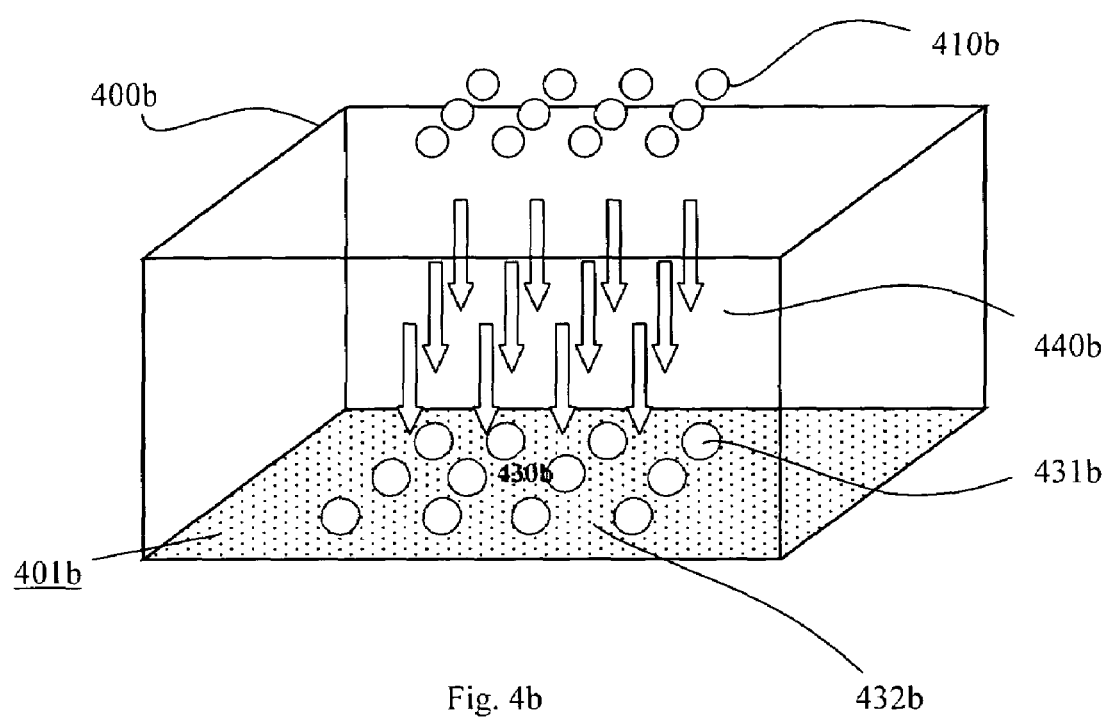
FIG. 4b is a schematic presentation of LED light-emitters installed above the water body of culture, forming an array-like regular pattern.

The preferred embodiment adopts multiple numbers of emitters, like FIGS. 4*a* and 4*b*, with on/off manipulations, producing effective contrast of bright and dark. Considering high burn-out consumption of emitters due to repeatedly turning them on and off, an area deployed with persistently glowing emitters in a loosely arranged pattern with space in between is preferred. This loose pattern of emitters can be made by a plurality of individual emitter or emitter group irregularly dispersed or regularly arranged. On the other hand, on/off manipulations of single or multiple emitters, which is grouped or not, is also sufficient to produce the bright and dark effects, and emitters in such condition, can flash synchronously, alternatively or totally in an unsynchronized fashion. As known in the art, a transparent structure or material (not shown in the figure) may cover over the light emitters to prevent them from immersion in water.

Figure 3:
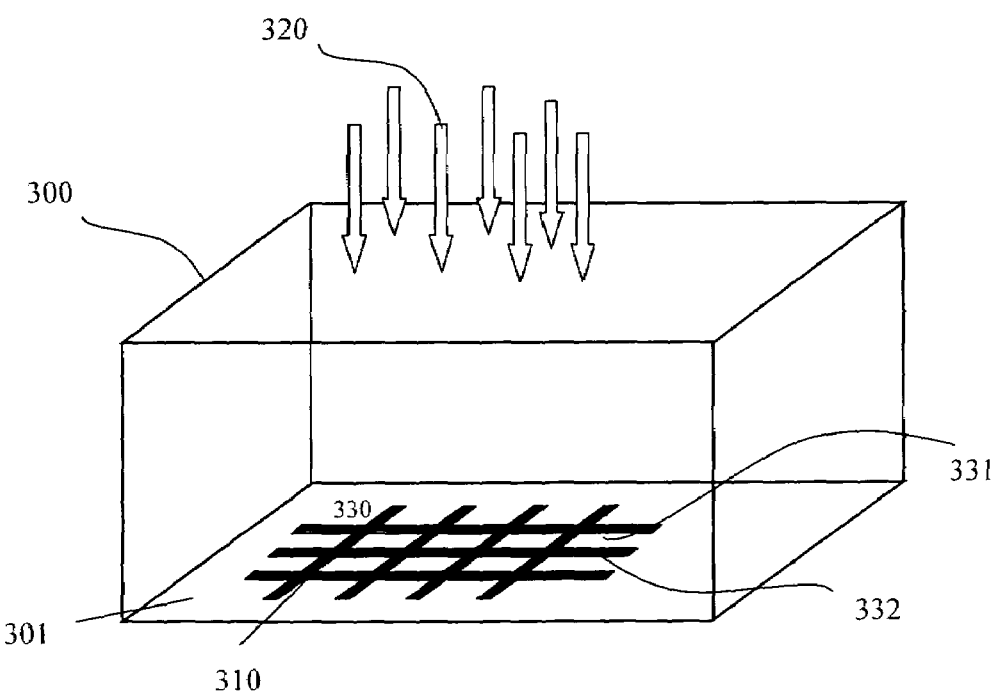

When a light-reflector/filter is chosen, such as the flat area with painted figures of different reflection levels, see FIG. 3, protrusions which form shadows by reflecting a portion of illuminating light, see FIGS. 6 and 7, a light filter which has sub-areas with different light transparencies (between and including 100% and 0%) and can thus serves as a sieve that creates an effective image of dark and bright contrast through and onto the bottom of the water body of culture, see also FIG. 5, there should be an auxiliary illuminating source, outside and/or inside the water body of culture.

The first brightness sub-areas and the second brightness sub-areas derived from the light emitting sources directly or with filters, or from the light reflecting sources can be shaped into linear, square, round, hexagon-like or any kind of geometric or none-geometric figures and arranged into rows, circles, grids or regular/irregular styles. The illuminating sources used to shine on filters, painted figures or protrusions are natural light and/or commercially available light bulbs or LEDs; normally, light that generates a light intensity at 1–300 lux at the surface of or within the water body of the culture is used.

Position of the light filter is chosen between bottom of the culture container and the illuminating source in order to form a light pattern mixed with shadow and lighted spots at the bottom or through the water body of culture, see FIG. 5. In one preferred embodiment, this filter can be installed under the water surface of the water body of culture to further providing the cultured crustaceans with a tangible and touchable structure for hiding and staying. Both the brighter areas, defined as the first brightness sub-areas derived from the illuminating light passing through the high-transparency openings in the filter, and the less-bright areas, defined as the second brightness sub-areas derived from the illuminating light blocked by the none-opening, or less-transparent, areas of the filter, jointly result in the formation of the bright and dark contrast.

The painted figures, images created by light-sifting filters and/or light-reflecting protrusions can be deployed directly onto the predetermined place. Areas surrounding the predetermined place can be further lighted with even or graded intensities to enhance the attracting effects built into the predetermined place.

The aquatic crustaceans in the present invention include, but not limited to, shrimp and crab; wherein *Litopenaeus vannamei, Penaeus monodon, Penaeus setiferus* and *Panaeus japonicus* are preferable.

In one embodiment, the cultured aquatic crustacean is white shrimp, *Litopenaeus vannamei*, and depth of the water body is of about 10 cm. A light filter plate, containing perforations of one size or various sizes at about 0.2 to about 2 cm in diameter, is placed about 4 to about 9 cm deep into the water. A fluorescent illuminating light source, reaching to the water surface evenly with a light intensity at about 10–60 lux, shines to the underwater light-sifting filter plate. While light reaches to the filter, a part of it goes through high-transparency perforations and the rest of it is blocked by the none-opening portion of the filter, an effect of bright and dark contrast is thus created at the predetermined place. For white shrimp, a bright and dark contrast with about 25 lux at the first brightness sub-areas and about 5 lux at the second brightness sub-areas has been found very effective. That is white shrimp of various weight (each of about 0.05 to 40 g) are observed to approach the predetermined place effectively after feeding. Moreover, the shrimp of large numbers can be seen to hide under this properly arranged light-filter plate as short as about 30 minutes after feeding.

The overall apparatuses for generating the effects of bright and dark contrast are shown in FIG. 3–7 and described in following embodiments.

In one embodiment as illustrated in FIG. 3, strip-like dark colored figures, constructed with dark paint or adhesive tape, are combined into a grid-like pattern 310 deployed onto a predetermined place 330 at the bottom 301 of the container 300. The deep-colored regions 332 and the un-painted region 331 at the predetermined place 330 respectively construct the aforesaid second brightness sub-areas and the aforesaid first brightness sub-areas, jointly these sub-areas constituting the bright and dark contrast under the illuminating source 320. When the container is made of the light-penetrable material at the predetermined place and the colored figures are also made of light-penetrable material, the illuminating source, at this condition, can be arranged under the container shining upwardly to the colored figures which is positioned inside the predetermined place or at the exterior side of the container corresponding to the predetermined place in order to produce an effect of bright and dark contrast. In another embodied example similar to the above-said arrangement, a combination of geometrical or none-geometrical patterns with different levels of brightness is installed inside at said predetermined place or on the exterior side at the location corresponding to the predetermined place; the illuminating source then arranged at a position where the illuminating source can shines to the installed combination of geometrical or none-geometrical patterns with different levels of brightness, when the area of said container which is shined by said illuminating source is light-penetrable.

In FIG. 4a, light-emitters 410a arranged into an array are the direct origin of the bright and dark contrast. The emitter 410a can be a LED, a fluorescent light bulb, an incandescent light bulb or any of other light sources. A LED is preferred here because it is economical and durable. However, the fluorescent light bulb is also preferred considering its low price and availability. The emitter 410a's array is placed at the bottom 401a of the container 400a. 440a shows the emitted light from the emitter 410a. And the predetermined place 430a can thus be distinguished into several less illuminated sub-areas 432a, intended to be the second brightness areas, and several illuminated sub-areas 431a, intended to be the first brightness areas. The emitters glow persistently or alternatively and their brightness is constant or changeable. In this embodiment, a plurality of individual LED glowing persistently is preferred because of its easy installation and management.

In FIG. 4b, light-emitters 410b arranged into an array is the origin of the bright and dark contrast. The emitter 410b can be a LED, a fluorescent light bulb, an incandescent light bulb or any of other light sources. A LED is preferred here because it is economical and durable. However, the fluorescent light bulb is also preferred considering its low price and availability. The emitter 410b's array is not placed at the bottom 401b of the container 400b like the embodiment depicted in FIG. 4a but instead placed above surface of the water body of culture loaded into container 400b. 440b shows the emitted light from the emitters 410b. With the emitter 410b's array image projecting on, the predetermined place 430b can thus be distinguished into several less illuminated sub-areas 432b, intended to be the second brightness areas, and several illuminated sub-areas 431b, intended to be the first brightness areas. The emitters glow persistently or alternatively and their brightness is constant or changeable. In this embodiment, a plurality of individual LED glowing persistently is preferred because of its easy installation and management.

In another embodied example, similar to the embodiments depicted in FIGS. 4a and 4b, with the portion of the container which is shined by the light-emitting source light-penetrable, the light-emitting source can be arranged at a position outside of the container where the light-emitting source can shine over the predetermined place. This position for the installment of the illuminating light is thus not limited to the space above or below the container.

In FIG. 5, a perforated light-sifting filter plate 510 with substantially 100% light transparency at its perforations 511 and substantially 0% light transparency at the rest of the plate surrounding perforations 511 is adopted to sift the illuminating light 520. Several light columns 540 are formed and therefore the filter plate produces simultaneously several illuminated sub-areas 531, intended to be the first brightness sub-areas, and the under illuminated sub-areas 532, intended to be the second brightness sub-areas. Both sub-areas jointly constitute the effect of bright and dark contrast at and above the predetermined area 530 on bottom 501 of container 500.

The filter plate 510 can be an opaque round plate of PVC-like material constructed as a horizontal light filter, but its shape, material and position angle respectively are not limited to be round, PVC and horizontal. Other shapes, materials and/or position suitable for generating intended effects are usable. For example, the quartz, acrylic, glass or the like could be employed as the material for filter plate 510. Shape of the opening 511 is not limited to be a round hole and size of each opening 511 is of one size or various sizes of about 0.1 to about 8 cm in diameter. The distance of about 0.1 to about 8 cm between neighboring perforations 511 has been tested to be effective. The perforations 511, although they have substantially 100% light transparency in this embodiment, other materials/structures contributing to different light transparency can be adopted. The light transparency of the filter plate itself is also adjustable.

Position of the light filter 510 is located between the bottom layer 501 and the illuminating source 520, either above the surface of or immersed in the water body of culture loaded in container 500. When this light-filtering plate immersed into the water 2–9 cm deep, it has been proved to be effective not only for attracting fed white shrimp but also creating a tactile sensation that enhances *Penaeus setiferus* and *Litopenaeus vannamei*'s hiding behavior at predetermined place 530 where the said bright and dark contrast is present. This kind of arrangement is preferred for the containers made of none light-penetrable materials. For adopted containers made of light-penetrable materials, the filter is still installed between the predetermined place and the illuminating source, and the illuminating source is not necessarily arranged above the container. For example, an illuminating source can be arranged below the container with a light-penetrable bottom and shines upwardly to a light-sifting filter which is located above the illuminating source but below the predetermined place; a pattern of bright and dark contrast can be generated at the predetermined place inside the container by such arrangement.

In all embodiments with light filters adopted, such as what described in FIG. 5 or its similarities, the filter's position angles can be further arranged to be adjustable. The filter's angle is defined as the angle between the normal line of the filter surface and the vertical axis of the container.

In FIG. 6, a network of thin-wall protrusion 610 is installed on bottom 601 of container 600 at a predetermined place 630. This network of protrusion 610 is formed by interlacing thin-wall plates into a grid-like pattern sitting vertically on the predetermined place 630 at bottom 601 of container 600. The height of the network of protrusion 610 in this embodiment is of 0.1 to 8 cm and the distance between two neighboring parallels of protrusion plates is of 0.1 to 8 cm. A bright and dark light contrast effect can be produced by projecting light source 620 at an angle toward network 610. Range of the aforesaid height of and distance between protrusion plates can be adjusted depending on size and species of the cultured animals and/or angles of the illuminating light. Shadow sub-areas 632 derived from shade of the network of protrusion 610 under illuminating light 620 are intended to be the second brightness sub-areas which constitute the bright and dark contrast when in combination with lighted sub-areas 631, intended to be the first brightness sub-areas. This embodiment has an additional advantage that it also provides habitable shelters facilitating the staying and hiding activities of aquatic crustaceans at predetermined place 630 after they have been attracted to it.

In FIG. 7, within container 700, a network of cone like protrusion 710 is constructed at a predetermined place 730 on container bottom 701 as a variation of the present invention. Shape of the protrusion 710 includes, but not limited to, a column-like or a taper shape. The network of protrusion 710 forms lighted sub-areas 731 and casts shadowed sub-areas 732 under angled illuminating light 720. The shadowed sub-areas 732 are intended to be the second brightness areas and the lighted sub-areas 731 are intended to be the first brightness sub-areas. Both, the first and second sub-areas combined, constitute the effect of bright and dark contrast. Height of the protrusion 710 in this embodiment is of about 0.1 to about 8 cm and distance between two neighboring protrusions 710 is about 0.1 to about 8 cm. Range of the aforesaid height and distance can be adjusted depending on size and species of the cultured animals and/or angle of illuminating light 720.

There is another embodied example similar to the embodiments in FIGS. 6 and 7. For it, an illuminating source can be arranged at a position outside the container where the light-emitting source can shine to the predetermined place inside the said container through a corresponding and light-penetrable portion of the said container. In this embodiment, position of the illuminating source is not limited to the space above the container.

The area of the predetermined place depends on species and size of animals reared and the size of culture container in use. It is preferred to have the area of the predetermined place and the rest of the container's bottom proportioned to a ratio like 1:1; in one culture test, such ratio has led to lowered cannibalization incidents. Thus, the area surrounding the predetermined place with brightness of even or gradually grading quality may be further applied into the above-mentioned embodiments to facilitate movement of none-molted crustaceans searching for their hiding place at the predetermined place and leave alone newly molted mates who have backward retraction ability to move and stay in areas surrounding but away from the predetermined place.

With the apparatuses and the methods in the aforementioned co-pending application utilized, it becomes feasible to construct high-density culture system with their culture containers' water depth reduced to almost 10 cm still with cultured crustaceans' cannibalistic activities under control. Construction of a multi-layered culture system is therefore feasible due to this reduction of water body in each culture layer. For culturing aquatic crustaceans and other animals, being able to have multi-layered culture greatly increases the space utilization efficiency of each square meter of a production area. The results generated in one embodied multi-layered system while culturing *Litopenaeus vannamei* are shown in Table 1.

The culture density of each square meter production floor is calculated as the total weight of shrimp cultured in 10-layered culture system, with 10 individual culture layers stacking one above the other, divided by the square area covered by the culture system which is equal to the bottom area of each individual culture layer. This table depicts that by using this 10-layered culture system with technology of the present invention in place, a very high production efficiency at a density of 10 kg or more *Litopenaeus vannamei* per square meter production floor can be attained with reduced cannibalism (expressed as nearly 100% survival rates). This is a significant improvement over the density of 0.73 kg marine shrimp produced over per square meter pond area (calculated by the data published in the annual report of Taiwan, R.O.C. Council of Agricultural Affairs on fishery in 1987, which is the most successful year of marine shrimp culture in Taiwan and the yield was 80,000 tons for 11,000 hectares of land used).

TABLE 1

| Date | Density (kg/m$^2$) | Weight per shrimp (gram) | Weekly growth (%) | Survival rate (%) | Total number of shrimp in sampled layer |
|---|---|---|---|---|---|
| 1. Growth progression data of white shrimp (*Litopenaeus vannamei*) juveniles in one test group | | | | | |
| Feb. 12, 2001 | 3.89 | 0.86 | | | 448 |
| Feb. 19, 001 | 4.7 | 1.05 | 22 | 99.11 | 444 |
| Feb. 26, 2001 | 6.72 | 1.52 | 45 | 98.87 | 439 |
| Mar. 5, 2001 | 9.18 | 2.09 | 39 | 99.09 | 435 |
| Mar. 12, 2001 | 10.42 | 2.43 | 16 | 97.47 | 424 |
| 2. Progression data of juvenile white shrimp growing into young shrimp in one test group | | | | | |
| Mar. 26, 2001 | 9 | 2.8 | | | 318 |
| Apr. 2, 2001 | 11.26 | 3.52 | 25 | 99.69 | 317 |
| Apr. 9, 2001 | 13.59 | 4.27 | 21 | 99.37 | 315 |
| 3. Growth progression data of young white shrimp in one test group | | | | | |
| Mar. 19, 2001 | 10.72 | 4.41 | | | 251 |
| Mar. 26, 2001 | 12.48 | 5.04 | 14 | 97.61 | 245 |
| Apr. 2, 2001 | 13.18 | 5.44 | 8 | 97.96 | 240 |
| 4. Summary data of growing large white shrimp in two test groups | | | | | |
| April 2001 (11 days) | 22.2 | 17.0–17.9 | 3.3 | 100 | 47 |
| April 2000 (12 days) | 19.3 | 16.1–17.4 | 5.0 | 100 | 42 |

The inventive subject matter being thus described, it will be obvious that the same may vary in many ways. Such variations are not to be regarded as a departure from the spirit and scope of the inventive subject matter, and all such modifications are intended to be included within the scope of the following claims.

What is claimed is:

1. A multi-layer culture system for culturing aquatic crustaceans, which comprises:
    multi-layer containers for carrying water body of culture;
    a means for generating an effect of bright and dark contrast, which is adapted to said multi-layer containers to express said effect of bright and dark contrast over a predetermined place; wherein said predetermined place is inside said multi-layer containers;
    an aeration system coupling with said multi-layer containers;
    a water filtering equipment coupling with said multi-layer containers; and
    a flow control piping and water delivery motor coupling with said multi-layer containers for circulation.

2. The system of claim 1, wherein said means for generating said effect of bright and dark contrast comprises a light-emitting source.

3. The system of claim 1, wherein said means for generating said effect of bright and dark contrast comprises a combination of geometrical or none-geometrical patterns with different levels of brightness.

4. The system of claim 1, wherein said means for generating said effect of bright and dark contrast comprises a plurality of protrusions capable of producing shadows of said protrusions.

5. The system of claim 1, wherein said means for generating said effect of bright and dark contrast comprises a light sifting filter.

6. The system of claim 1, wherein said predetermined place is selected from the group consisting of
    (1) a region on the inner side of the bottom of said multi-layer containers;

(2) a region on the inner side of wall below the water surface in said multi-layer containers;
(3) a region at or under the water surface on a floating attachable material inside said multi-layer containers; and
(4) a region at or under the water surface on a fixed attachable material inside said multi-layer containers.

7. The system of claim 1, whereby said predetermined place can be distinguished into a first brightness sub-area and a second brightness sub-area and said first brightness sub-area is brighter than said second brightness sub-area.

8. The system of claim 1, wherein said water filtering equipment includes a biochemical filtering equipment.

9. The system of claim 1, wherein said water filtering equipment includes a physical filtering equipment.

* * * * *